May 9, 1961 E. AZARI ET AL 2,983,507

CARD PROCESSING APPARATUS

Filed Sept. 29, 1958 8 Sheets-Sheet 1

INVENTORS:
Eric Azari
Herman J. Malin
Allan Orner

By Smyth & Roston

Attorneys

May 9, 1961 E. AZARI ET AL 2,983,507

CARD PROCESSING APPARATUS

Filed Sept. 29, 1958 8 Sheets-Sheet 2

INVENTORS.
Eric Azari
Herman J. Malin
Allan Orner

By Smyth & Roston

Attorneys

May 9, 1961 E. AZARI ET AL 2,983,507

CARD PROCESSING APPARATUS

Filed Sept. 29, 1958 8 Sheets-Sheet 3

INVENTORS:
Eric Azari
Herman J. Malin
Allan Orner

By Smyth & Roston
Attorneys

May 9, 1961 E. AZARI ET AL 2,983,507

CARD PROCESSING APPARATUS

Filed Sept. 29, 1958 8 Sheets-Sheet 4

INVENTORS:
Eric Azari
Herman J. Malin
Allan Orner

By Smyth & Roston
Attorneys

CARD PROCESSING APPARATUS

Filed Sept. 29, 1958 8 Sheets-Sheet 5

INVENTORS:
Eric Azari
Herman J. Malin
Allan Orner
By Smyth & Roston
Attorneys

CARD PROCESSING APPARATUS

Filed Sept. 29, 1958 8 Sheets-Sheet 6

INVENTORS:
Eric Azari
Herman J. Malin
Allan Orner
By Smyth & Roston
Attorneys

May 9, 1961 E. AZARI ET AL 2,983,507

CARD PROCESSING APPARATUS

Filed Sept. 29, 1958 8 Sheets-Sheet 7

INVENTORS:
Eric Azari
Herman J. Malin
Allan Orner

By Smyth & Roston
Attorneys

May 9, 1961 E. AZARI ET AL 2,983,507

CARD PROCESSING APPARATUS

Filed Sept. 29, 1958 8 Sheets-Sheet 8

INVENTORS:
Eric Azari
Herman J. Malin
Allan Orner

By Smyth & Roston

Attorneys

United States Patent Office 2,983,507

Patented May 9, 1961

2,983,507

CARD PROCESSING APPARATUS

Eric Azari, Pacific Palisades, Herman J. Malin, Culver City, and Allan Orner, Los Angeles, Calif., assignors to Magnavox Company, Los Angeles, Calif., a corporation of Delaware Filed Sept. 29, 1958, Ser. No. 764,066

16 Claims. (Cl. 271—5)

The present invention relates to apparatus for handling information storage cards, and it relates more particularly to an improved reversible feeding and stacking station for use in such apparatus.

In the data processing art, digital techniques have been used to store a large amount of information. In one type of data processing system, the information is stored on a plurality of discrete cards. The information is recorded on the cards in a plurality of rows and columns of binary bits. These bits individually represent a "1" or a "0," and each column of bits corresponds to a "position" of the particular card and represents a multi-digit binary number.

The information may be stored on the cards in the form of magnetic areas of one polarity or another, in the form of holes punched in the cards whose presence or absence represents a binary "1" or a binary "0," in the form of black or white markings, or in any other appropriate form.

Many thousands of information storage cards of the type under discussion are used in complex data or card processing systems so that the millions of binary bits which are required to record the information may be properly stored. The information storage cards may be housed in a stacked relation in a plurality of magazines, and the magazines themselves may be stored in suitable racks. For processing purposes, a magazine of cards is selected and placed in a card holding station which is included in the card processing apparatus.

The information storage cards are maintained in a stacked relationship in the card holding station and they are sequentially fed to a transport medium which also is included in the card processing apparatus. This transport medium may, for example, be a rotatable vacuum pressure drum which exerts a vacuum pressure at its peripheral surface. This drum is capable of receiving cards from the card holding station and of carrying the cards at fixed positions on its periphery. Such a transport drum will be described subsequently in the present specification. However, it will become evident that other types of movable or stationary transport media for the cards can be used.

The present invention provides a reversible card holding station which is similar in some respects to the station disclosed and claimed in the co-pending application Serial No. 645,639, filed March 12, 1957, in the names of Alfred M. Nelson et al. A feature of the present invention is the provision of an improved mechanical control for the feed head and stack head of the reversible station so that these heads may be positively moved between their stand-by and operating positions.

As mentioned above, it is usual to hold the cards in a stacked condition in the card holding station. Because of the large number of cards used in complex data processing systems, it is important from a time standpoint that the cards move in and out of the card holding station at an extremely high rate of speed and that a relatively large number of cards be stacked in the station.

It has been found that there may occasionally be a tendency for the cards to jam as they are fed into the card holding station from the transport medium. This jamming has been found to become more prevalent when large numbers of cards are fed into the card holding station and when the feeding speed of the cards is relatively high. The cause for this jamming of the cards has been found to result from the fact that cards fed into the station are normally urged against the surface of the transport medium by cards already in the station. This causes subsequent cards to become arrested on the transport medium while they are still displaced from the mouth of the card holding station. Such subsequent cards are therefore prevented from being deposited in the station. These latter cards then arrest further cards on the transport medium and this results in an aggravated jammed condition.

Co-pending application Serial No. 658,590, filed May 13, 1957, in the name of Alfred E. Gray et al. (now United States Patent No. 2,883,188), describes and claims a rotatable element which engages the trailing edges of the information storage cards as they are deposited into the card holding station. This rotatable element continually moves the trailing edges of the cards away from the periphery of the transporting medium as the cards are being deposited in the card holding station. The rotatable element serves to maintain the cards in the station at the proper approach angle to the transport medium, and this obviates any possibility of jamming.

It has also been found that when the card holding station is conditioned to a feeding mode, and when a relatively large number of cards are stacked in the station, there also is a tendency for the cards to jam. This latter tendency is due to the pressure of the cards in the station tending to force the leading card out of proper alignment with the throat of the station through which that card must pass to leave the station. A similar rotatable element has been found to alleviate this latter condition, and this rotatable element is positioned to flex the trailing edges of the leading cards in the stack to relieve the load of the entire stack from the front card.

However, it has been found that the required position of the rotatable element to prevent jamming of the cards during the stacking mode of the station is different from the required position of that element to prevent jamming during the feeding mode. The embodiment of the present invention to be described provides a single rotatable element that is continuously rotated and which is mechanically coupled in an improved manner to the linkage which controls a feed head component of the card holding station. The construction is such that the rotatable element can assume its correct position during the stacking mode of the station, and so that it can be automatically shifted to its proper position for the feeding mode of the station.

The card holding station of the present invention also includes an improved pick-off assembly to assist in the sequential stacking of cards in the card holding station. The pick-off assembly is included as an integral part of a blower pick-off unit in the embodiment of the invention to be described. This unit may be conveniently mounted, and it provides for the precise positioning of the streams of pressurized air emerging from the blower unit with respect to the pick-off fingers and its bulged body portion. This latter feature is realized because of the integral nature of the unit. The air streams are directed tangentially of the surface of the transport medium and over the fingers and body portion of the pick-off assembly to provide the desired air cushion. A stack head component of the card holding station is provided with apertures aligned with the air streams so that the streams will have an unimpeded path and so that turbulence is thereby prevented.

By directing a stream of air over the pick-off member and against the cards in the card holding station, the trailing ends of the cards in the station are maintained away from the transport medium so that successive cards being transported by the medium can become properly stacked in the card holder. The imposition of such a pneumatic force is also instrumental in operating upon the trailing end of each particular card moving over the transport medium so that the next card will be able to move the particular card away from the transport medium and deposit the card in the station. The imposition of a pneumatic force past the crest of the pick-off member and against the cards in the station constitutes an important feature of the invention.

Other features and advantages of the invention will become apparent upon a consideration of the following specification when taken in conjunction with the accompanying drawings, in which:

Figure 1 is a top plan view of a simplified type of card processing apparatus which incorporates a pair of card holding stations constructed in accordance with the present invention;

Figure 2 is a perspective view of one of the improved card holding stations of Figure 1, this view showing certain of the components of the station with others being omitted and specifically illustrating the improved pick-off blower unit assembly which causes streams of pressurized air to be passed over the fingers and bulged body portion of the pick-off and through aligned apertures in the stack head without turbulence;

Figure 3 is an elevational view, partially in section and substantially on the line 3—3 of Figure 1 of a vacuum pressure transport drum which may be used to constitute an appropriate transport medium for the card processing apparatus which utilizes the improved card holding station of the present invention;

Figure 4 is a side elevational view of the improved card holding station of the invention, with the mouth of the station being disposed to the left, and this view showing particularly the cam drive for the feed head and stack head of the station, the solenoid-control clutch arrangement for controlling the cam drive, and the linkage between the rotatable element which engages the cards in the station and the feed head lever so that the rotatable element may be shifted from one position to another depending upon the operational mode of the station;

Figure 4:
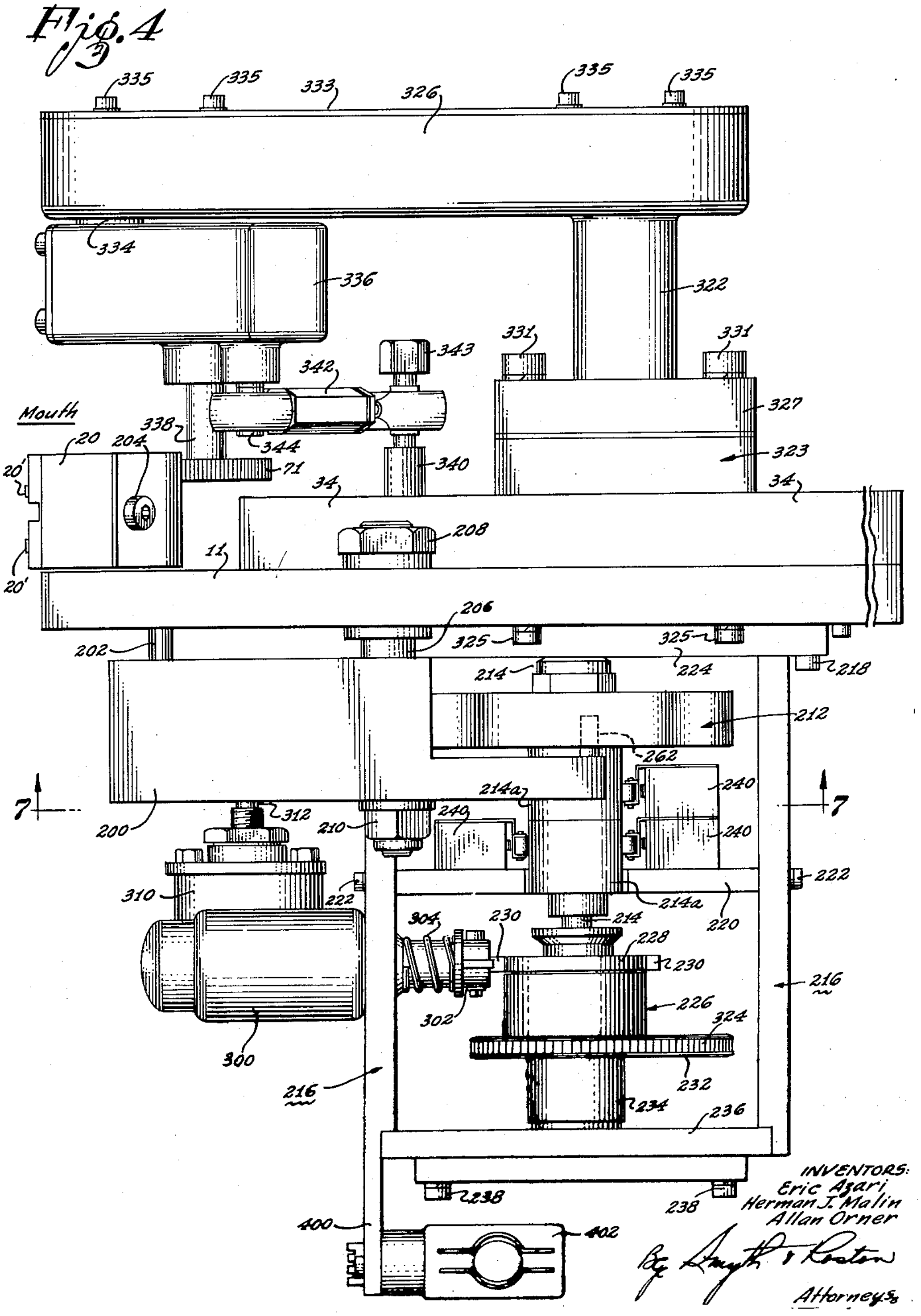
Figure 7:
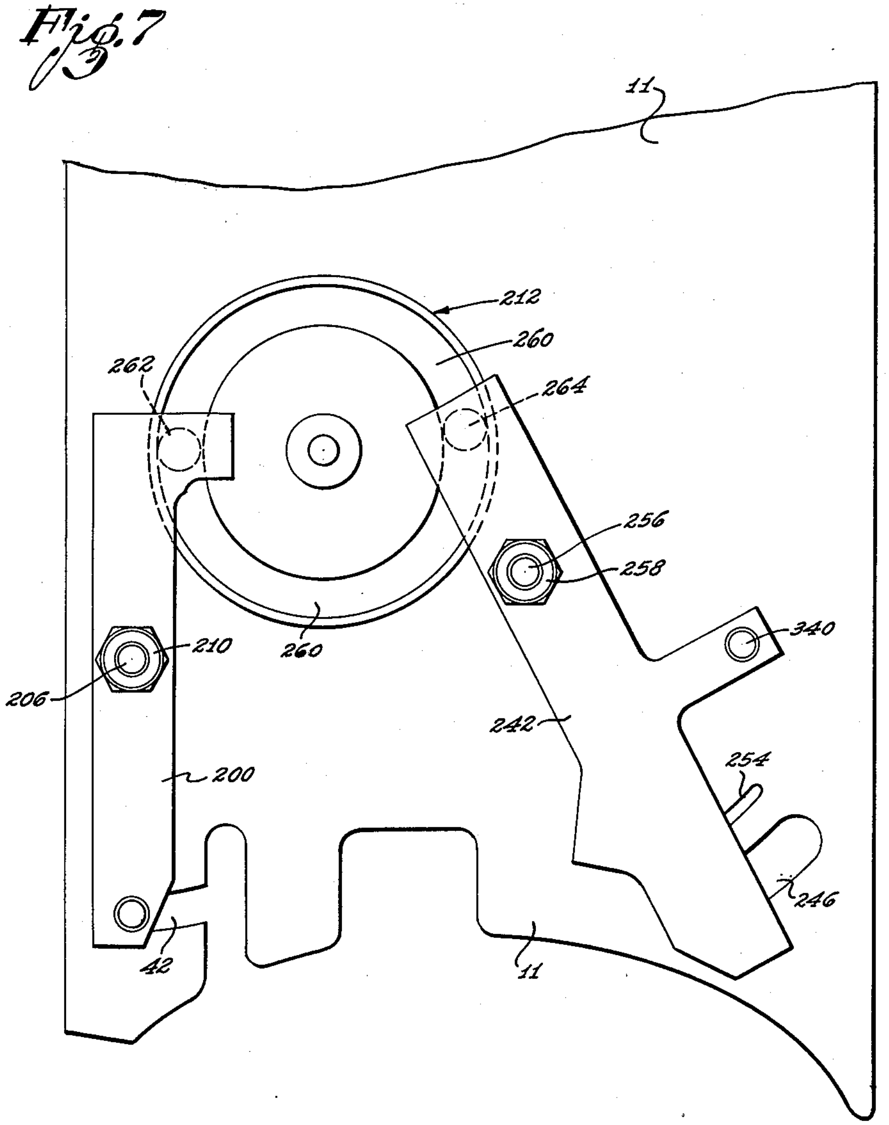
Figure 8:
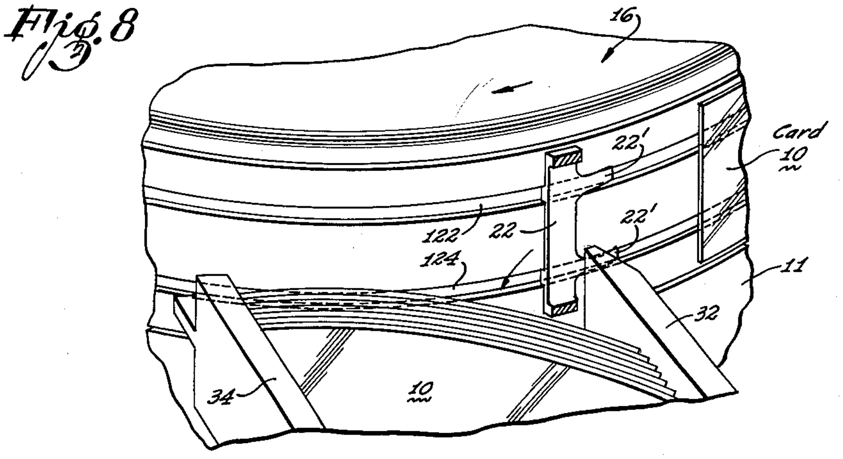
Figure 9:
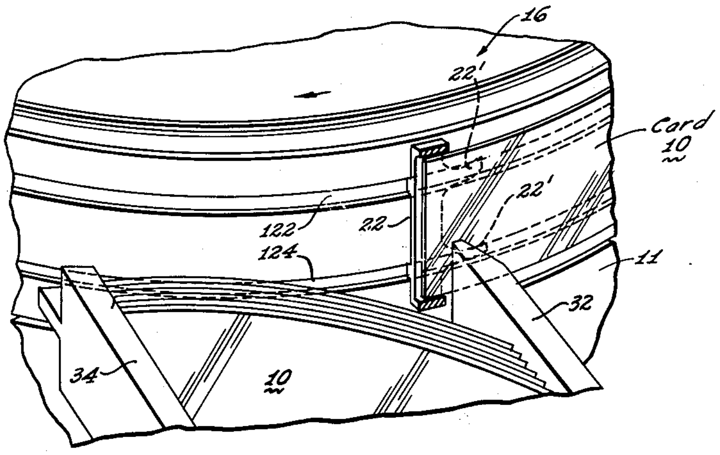
Figure 10:
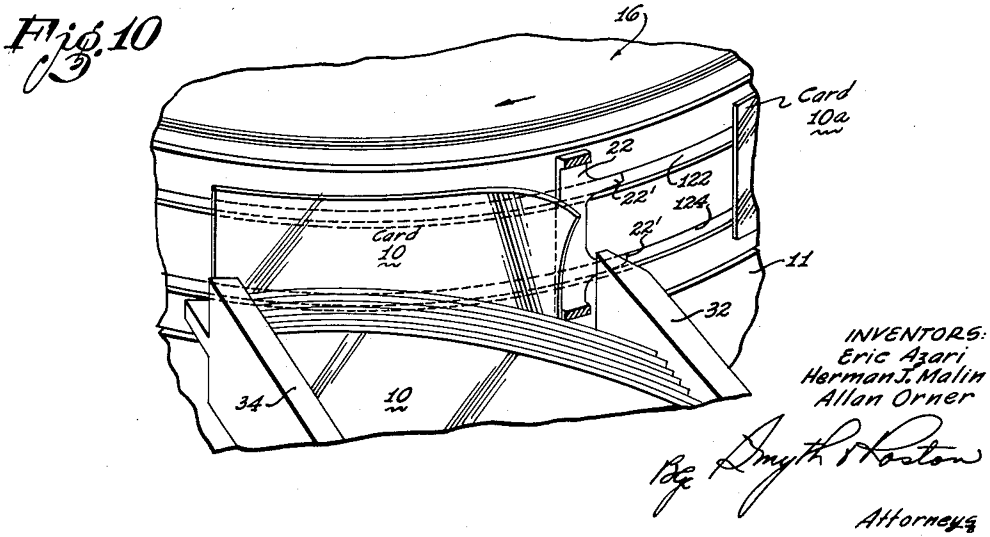

Figure 7 is a bottom view, substantially on the line 7—7 of Figure 4, and showing particularly the levers which drive the stack head and the feed head, and the manner in which these levers are coupled to cam followers which, in turn, are driven by the rotatable cam assembly; and Figures 8 to 10, inclusive, are fragmentary perspective views of a card holding station constructed in accordance with the invention, these views illustrating in successive steps the manner in which the pick-off blower unit constituting a feature of this invention functions to deposit an information storage card in the station.

Figure 1:
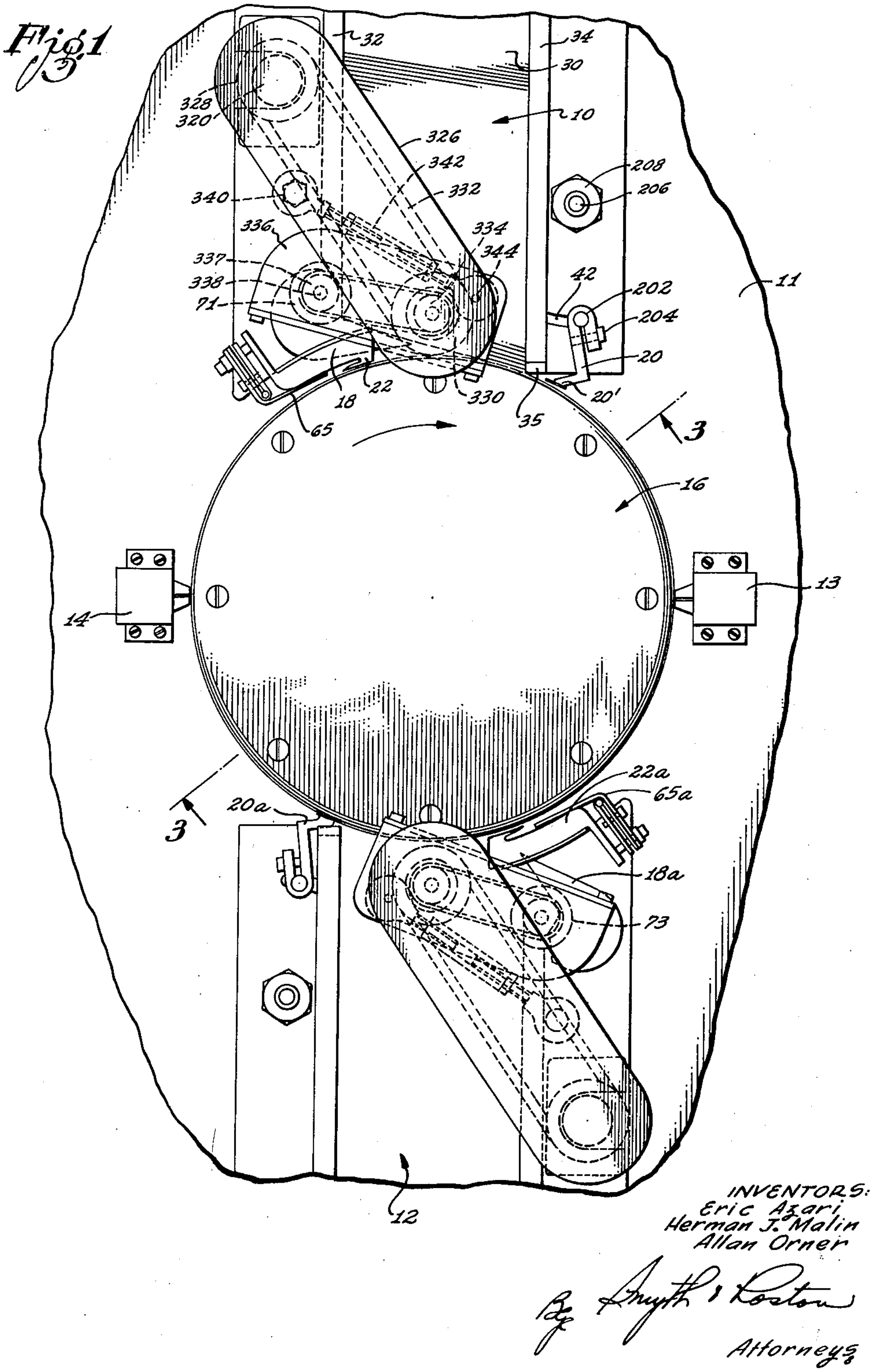

References will now be made to the drawings, and particularly to Figures 1 and 2 for a description of some of the components of the card holder station of the invention and of apparatus in which it can be used. As shown in Figure 1, a first card holder station 10 is mounted on a table top 11 adjacent the peripheral surface of a rotatable vacuum pressure transport drum 16. A second card holder station 12 is also mounted on the table top 11, and the second card holder is positioned adjacent the peripheral surface of the drum 16 and diametrically opposite to the card holder station 10. Although the transport drum 16 is specifically shown and described, it will be appreciated that any suitable transport means and that such transport means may be either movable or stationary, especially with reference to the terminology in the claims.

A first reading or writing station is mounted on the table top 11, and this processing station is provided with appropriate transducing means 13. This first processing station is positioned between the card holder stations 10 and 12. The transducing means 13 may include a plurality of electromagnetic transducer heads when magnetic recording is used on the cards. Other types of transducers, of course, will be used for the other types of recordings. The transducer heads are positioned to scan different rows of data on the cards used in the illustrated apparatus.

The cards are supported in a stacked relationship in the card holder 10 and are fed in sequence in a manner to be described to the peripheral surface of the transport drum 16. These cards are transported by the drum past the transducer heads of the transducing means 13 and are deposited in the card holder station 12. As each card passes the transducing means 13, information recorded on the particular card may be read or new information may be recorded on the card.

A second reading or writing station is mounted on the table top 11, and this latter processing station is provided with transducing means 14. The second processing station may be similar to the first processing station which incorporates the transducing means 13, and the second processing station may be positioned diametrically opposite the first processing station. As will be described, in a second operational mode, cards from the station 12 may be transported by the drum 16 past the transducing means 14 for further processing, and such cards may be subsequently deposited in the card holder station 10. The transport drum 16 is rotated in a clockwise direction, as shown by the arrow in Figure 1, to accomplish the purposes described above.

Each of the card holder stations 10 and 12 has a reversible mechanism associated with it, and this reversible mechanism is constructed in accordance with the present invention and in a manner to be described. Briefly, the card holder station 10, for example, has a vacuum pressure feed head 18 which is movably mounted adjacent the leading wall 32 of the station. This station also has a stack head 20 which is movably mounted adjacent the trailing wall 34 of the station. The walls 32 and 34 are mounted on the table top 11 in spaced parallel positions and are adapted to support the information storage cards in a stacked relationship, with the lower edges of the cards resting on the table top. A pusher (not shown) is resiliently biased against the stack of cards in the station. This pusher holds the cards in a stacked relationship and urges them towards the mouth of the station.

The feed head 18 is movable in a manner to be described to an operating position in which it is capable of controlling the feed of cards from the card holder station 10 to the periphery of the drum 16. The feed head is also movable to a stand-by position in which it is disposed out of coupled relationship with the cards in the station 10. The stack head 20 is also movable to an operating position in which it is capable of stripping cards from the periphery of the drum 16 and of depositing the cards in the card holder 10. The stack head 20 is also movable to a stand-by position in which it is disposed out of coupled relationship with the cards on the transport drum 16 such that it cannot operate to transfer cards from the transport drum to the station 10. The control mechanism associated with the card holder station of the invention provides that the feed head is moved to its operating position as the stack head is moved to its stand-by position, and vice versa.

The feed head 18 is constructed to exert a vacuum pressure at its surface 18′ (Figure 2) when in its operating position. This vacuum pressure is exerted on the trailing portion of the leading card in the station 10. The same leading card rests on the peripheral surface of the transport drum 16, and the drum also exerts a vacuum pressure on that card. The other cards in the station, as illustrated, are held in a stacked condition in the station behind this leading card.

The station 10 is illustrated in Figure 1 as being in a feeding mode. In this mode, the feed head 18 is moved forward to its operating position so that its face 18′ extends into the station to engage the leading card in the manner described. The stack head 20 is, at this time, moved back to a stand-by position.

The force exerted at the peripheral surface of the drum 16 tends to withdraw the leading card from the station 10, whereas the force exerted by the feed head 18 at its face 18′ tends to retain that card in the station. The force exerted on the card by the feed head 18 is made greater than that exerted by the drum 16, so that the feed head is able to overcome the force exerted by the drum. So long as the leading card is held in this manner in the station 10, the other cards supported in stacked relationship in the station are also held in the station.

Whenever the vacuum pressure of the feed head 18 is momentarily interrupted, the leading card in the station 10 is withdrawn by the drum 16. The trailing wall 34 has an integral tongue 35 formed at its leading edge, and this tongue is spaced a short distance from the periphery of the drum 16 to define a throat with that periphery. The dimensions of the throat are such that one card at a time only can pass from the card holder 10 to the periphery of the drum 16. The interval of interruption in the vacuum pressure to the feed head 18 is usually made of such a duration that only one card is released from the station to the periphery of the drum for each such interruption. The next card in the station now comes into position as the leading card, and it is retained in the station until the next interruption of the vacuum pressure to the feed head 18.

In the second operational mode of the reversible station 10, the feed head 18 is withdrawn back to a stand-by position, and its vacuum pressure is turned off. The stack head 20 is simultaneously moved forward in a slot 42 in the table top 11 to its operating position. The stack head has a pair of guide fingers 20′ (Figure 2) which engage peripheral grooves in the drum 16 to assure intimate contact between the stack head and the drum when the stack head is in its operative position. When the apparatus is in this latter operational mode, any card transported by the drum rides over the guide fingers 20′ and is arrested by the body portion of the stack head 20.

A stationary pick-off member 22 is positioned adjacent the leading wall 32 of the card holder 10. The details of this pick-off member are shown more clearly in Figure 2, and as shown in that figure, the pick-off member has a pair of guide fingers 22′ which extend into respective ones of the peripheral grooves of the drum 16. These fingers are integral with a body portion of the pick-off member which is bulged, or humped radially outwardly so that the cards transported by the drum 16 ride over the fingers and are lifted outwardly from the periphery of the drum by the bulged body portion. Therefore, a card arrested by the stack head 20 has its training edge projecting over the fingers 22′ and bulged body portion of the pick-off member 22, and the trailing edge of the card is therefore displaced outwardly from the periphery of the drum.

The next card transported by the drum 16 rides over the fingers 22′ of the pick-off member 22 and over its bulged body portion and under the preceding card so as to pry the preceding card from the periphery of the drum. The second card is also stopped by the stack head 20, and the preceding card is deposited by it in the card holder station 10. This action continues from card to card. In this manner, the apparatus is conditioned so that cards transported by the drum 16 may be stacked in proper order in the card holder station 10.

Therefore, the reversible feeding-stacking card holder station 10 described above has two operational modes. In a first mode, cards are held in a stacked relationship in the station, and such cards may be controllably and successively fed to the peripheral surface of the transport drum 16 as a result of the control of the vacuum pressure at the feed head 18. In a second operational mode of the card holder station 10, cards transported by the periphery of the drum 16 are stripped by the stack head 20 from that periphery and deposited in the card holder station.

The card holder station 12 has a feed head 18*a* positioned adjacent its leading wall, and it has a stack head 20*a* positioned adjacent its trailing wall. The station 12 also has a pick-off member 22*a* mounted adjacent its leading wall. The feed head 18*a* and the stack head 20*a* may be similar in their construction and operation to the corresponding feed head 18 and stack head 20 associated with the station 10. Likewise, the pick-off member 22*a* may be similar in its construction and operation to the pick-off member 22.

The manner of controlling the feed heads and stack heads to condition the stations 10 and 12 to their feeding modes and stacking modes will be fully described. As noted above, the station 10 is shown as being in its feeding mode in Figure 1, and the station 12 is illustrated as being in its stacking mode.

In one mode of operation, the card holder station 10 may contain a plurality of information storage cards in stacked relationship. In that mode of operation, the reversible mechanism associated with the station 10 may be conditioned for feeding the cards to the drum 16, as shown in Figure 1. The station 12, on the other hand, may be empty and its reversible mechanism may be conditioned to deposit cards in the card holder, as shown in Figure 1. In this mode of operation, the cards from the card holder station 10 may be controllably fed in succession to the periphery of the transport drum 16 and carried by the drum past the first processing station which includes the transducing means 13. After the processing of the cards by the transducing means 13, they may be deposited in the card holder station 12.

At the completion of the processing operation, the operational modes of both the stations 10 and 12 may be reversed so that the cards may be returned by the transport drum 16 in their original order to the station 10. The cards may be further processed at the second processing station which includes the transducing means 14 as they are being returned to the station 10.

The system and apparatus of Figure 1 is intended merely to illustrate an operational application of the improved card holder station of the present invention. This station itself, however, will find wide utility in most, if not all, types of data processing systems and apparatus for handling information storage cards.

Figure 2:
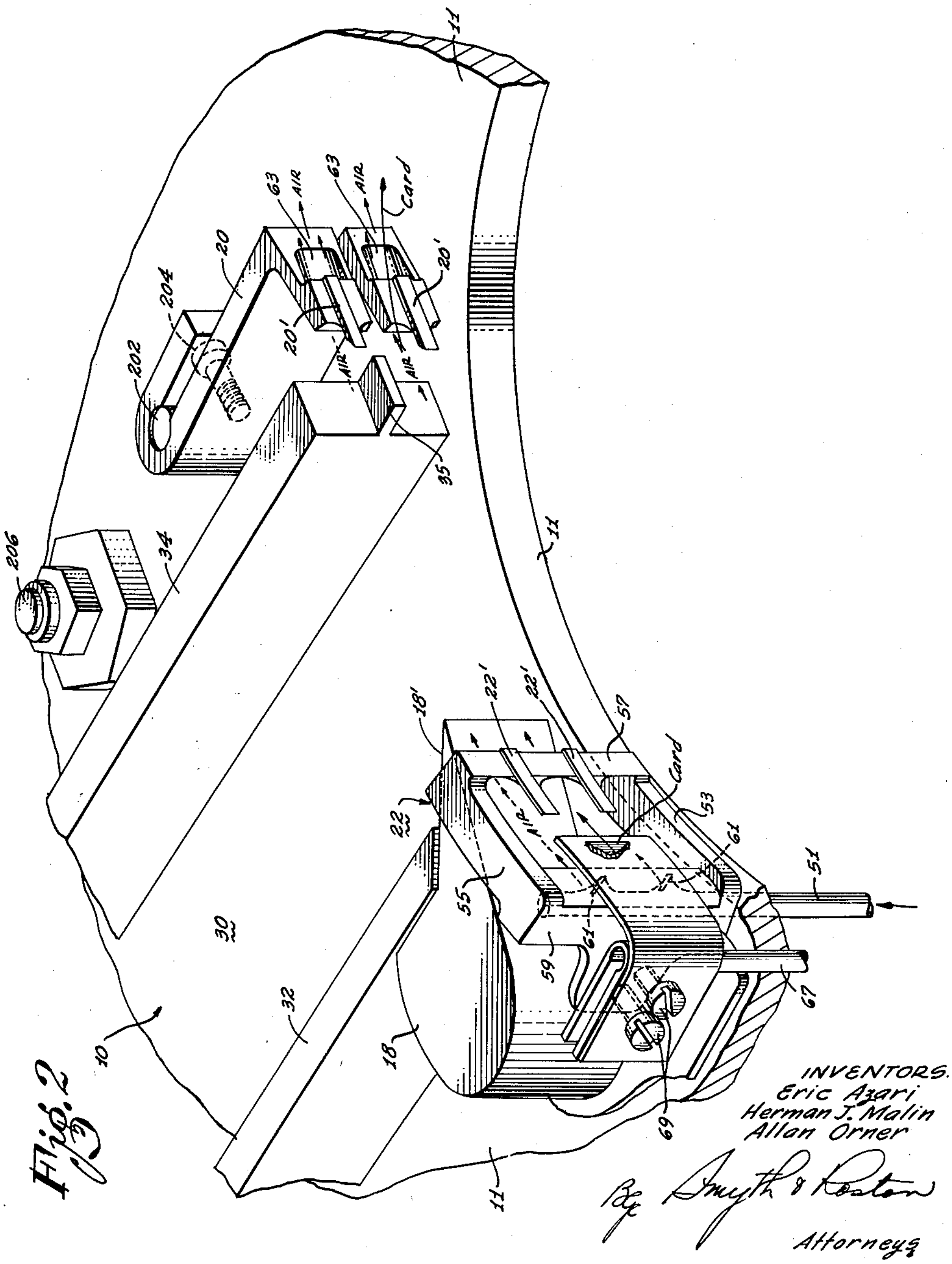

As illustrated in Figure 2, the pick-off member 22 has a blower unit associated with it, the blower unit being integral with the bulged body portion of the pick-off member and with the fingers 22′. This blower unit includes an inlet line 51 which extends upwardly through the table top 11 and into the pick-off member 22. The pick-off member has a pair of arms 53 and 55 which are integral with a cross arm 57 and which extend back from the cross arm in a spaced and parallel relation. The cross arm 57 supports the fingers 22' on its lower surface, and this arm constitutes the bulged crested body portion of the pick-off. As the cards are transported by the drum 16, they are moved between the arms 53 and 55 and upwardly over the fingers 22' and over the body portion formed by the cross arm 57. The cards arrested by the stack head 20 are then held with their trailing edges extending back over the cross arm 57 and held out by it from the peripheral surface of the transport drum 16.

The inlet line 51 extends into a second cross portion 59 which is integral with the arms 53 and 55 and which extends across these arms. The second cross portion 59 has a pair of orifices 61 which communicate with the inlet line 51 and which are positioned so that when a pressurized fluid, such as air, is introduced through the line 51, streams of pressurized fluid emerge from the orifices 61 and are directed over the surface of the bulged crested body portion of the pick-off member formed by the cross arm 57.

The integral construction of the pick-off member 22 and its associated blower permits the entire assembly to be manufactured as a unit, so that the pressurized streams of fluid emitted by the orifices 61 are precisely directed across the surface of the body portion of the pick-off member. These pressurized streams form a fluid cushion for the cards transported over the pick-off member and prevent the cards from being slowed down by frictional forces which would otherwise be encountered.

The stack head 20 has a pair of apertures 63 which are in axial alignment with respective ones of the orifices 61 when the stack head is moved to its operative position. The apertures 63 provides passageways for the pressurized fluid streams from the orifices 61 so that these streams pass freely across the mouth of the card holder station, and turbulence is prevented.

A switch actuator 65 is pivotally mounted on a vertical shaft 67 adjacent the pick-off member 22. The switch actuator is clamped to the shaft 67 by means of a pair of screws 69. The shaft 67 extends through the table top 11 and may be connected to a switch armature (not shown). The arrangement is such that when a single card is transported by the drum 16 to the pick-off member 22, the switch actuator 65 is not moved. However, when one or more cards becomes superimposed on the periphery of the drum 16, the superimposed cards move against the switch actuator 65 causing the shaft 67 to turn. The turning of the shaft 67 is caused to operate a suitable switch which cuts off the apparatus. This precaution is appropriate, because the superimposing of one card on another on the periphery of the drum 16 indicates a jamming condition, and it is essential that the apparatus be stopped before the cards become jammed and damaged. The card holder station 12 has a similar switch actuator **65*a*** positioned at its mouth. The concept of these protective switches is fully described and claimed in copending application 665,496, filed June 13, 1957, in the name of A. Gray et al., and a further description of these mechanisms is believed to be unnecessary in the present specification.

The apparatus of the invention includes a rotatable element such as a wheel 71 (Figure 1) which is held adjacent the leading wall 32 of the card holder station 10 and which protrudes into the station over the feed head 18. This rotatable wheel is suspended in a manner to be described over the feed head 18, and it is rotatable about a vertical axis. The peripheral edge of the wheel 71 protrudes into the station 10, and the wheel is positioned to frictionally engage one end of the cards fed into that station when the station is in its stacking mode, or fed out of the station when the station is in its feeding mode. This wheel serves to maintain at least the leading cards in the station at an angle to the periphery of the drum 16.

In the illustrated operational mode, the station 10 is conditioned to its feeding mode. For this mode, and in a manner to be described, the wheel 71 is moved to a predetermined position so that the cards may be held at a selected inclination to the periphery of the drum 16. This inclination is such that the cards may pass in a one-by-one sequence through the throat formed by the tongue 35 when they are released by the feed head.

A similar wheel 73 is positioned adjacent the leading wall of the station 12. The wheel 73 is also rotatably mounted about a vertical axis, and it is suspended, in like manner to the suspension of the wheel 71, over the feed head **18*a*. The rotatable wheel 73 and the wheel 71 are preferably knurled, or these wheels may be provided with rubber rims. The wheel 73 is positioned adjacent the mouth of the station 12, and a portion of the periphery of the wheel protrudes into the station. The wheel 73 is adapted to frictionally engage one end of the cards in the station 12. Each of the wheels 71 and 73** is movable, in a manner to be described, between a first position when the corresponding station is in a feeding mode, and a second position when the corresponding station is in its stacking mode.

When the particular station is in its stacking mode, the wheels 71 or 73 function to continually move the trailing ends of the cards deposited in the station away from the periphery of the drum 16. Without these wheels, there is a tendency for the cards in the station to be moved against the periphery of the drum 16, and this prevents the succeeding cards from reaching the stack head 20 or **20*a* so that they may be deposited into the station. As described above, this results in a condition in which cards may become jammed at the mouth of the station 12**.

However, it has been found that the wheels, such as the wheel 71, must have a first position so that it can properly perform its function when the station 10 is in its feeding mode and a second position so that it can properly perform its function when the station is in a stacking mode. The appropriate control for the wheels, such as the wheel 71, will be described in detail subsequently.

The rotatable drum 16 may be constructed in any suitable manner. Also, as noted above, other appropriate transport means may be used for carrying the cards from one card holder station to another and past the processing stations. The drum 16, for example, may be similar in its construction to the transport drum disclosed and claimed in copending application Serial No. 600,975, which was filed July 30, 1956, in the name of Loren R. Wilson, now U.S. Patent No. 2,883,189. The details of the transport drum illustrated in Figure 3 are similar to the embodiment of the drum disclosed and claimed in the Wilson application.

Figure 3:
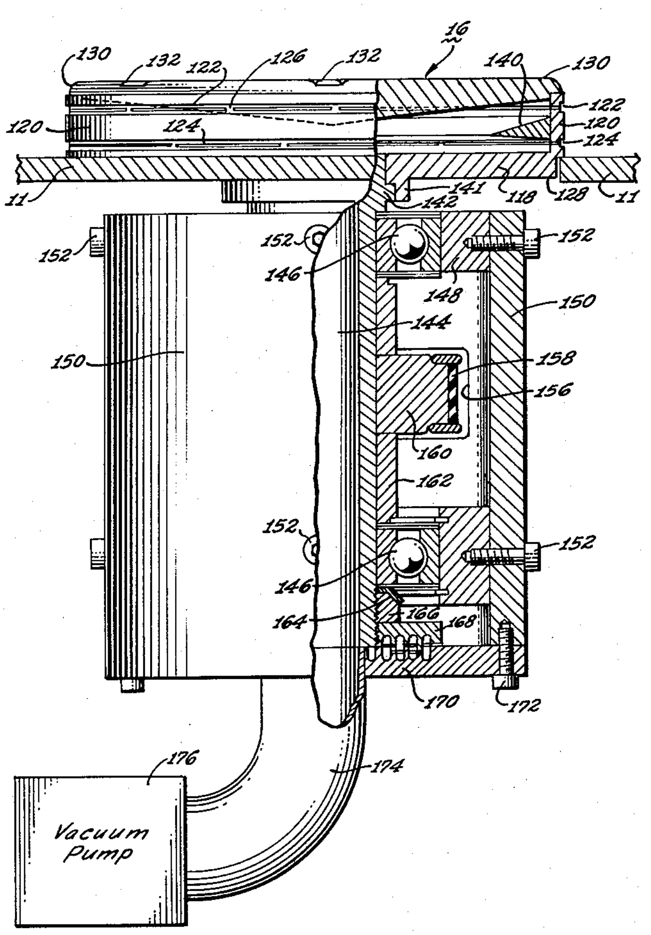

As shown in Figure 3, the drum 16 has a lower section and an upper section. The lower section of the drum includes a disk-like bottom portion 118 and an integral annular side portion 120. A pair of axially spaced peripheral orifices 122 and 124 extend through the side portion 120. Each of these orifices has an external groove associated with it, these grooves having been mentioned earlier and which serve to receive the fingers 22' of the pick-off member 22 and the fingers 20' of the stack head 20. The peripheral orifices are discontinuous in that they are interrupted at selected intervals by a series of ribs 126 which are integral with the side portion 120.

The disk-like bottom portion 118 of the lower section of the drum is undercut, as shown at 128. This enables the floor 30 of the card holder station 10, for example, to extend beyond the outer limits of the side portion 120, so that the portion 120 overlaps the floor 30 in the illustrated manner.

The upper section of the drum 16 is in the form of a disk-like member 130 which engages the annular side member 120 of the lower section. The disk-like member 130 forms an enclosure with the lower section of the drum, with the disk-like member being parallel to the disk-shaped bottom porion 118 of the lower section. The disk-like member 130 is held in place on the side portion 120 of the drum by a plurality of screws 132.

When one of the information storage cards is fed from the station 10 to the drum 16, it is held by vacuum pressure on the outer peripheral surface of the side portion 120, as will be described.

A deflector ring 140 is supported within the interior of the drum 16 in press-fit with the inner surface of the annular side portion 120. This deflector ring is tapered toward the center of the drum to provide a smooth streamlined path for air which is drawn in through the orifices 122 and 124. The undersurface of the disk-like member 130 is bulged so as to have a convex shape. This convex shape also cooperates with the deflector ring 140 in providing a smooth path for the air drawn in through the orifices 122 and 124.

A portion 118 of the lower section of the drum 16 has a downwardly extending annular sleeve 141. The sleeve 141 fits in friction-fit over a collar 142 provided at the upper end of a vertically supported hollow shaft 144. Therefore, rotation of the hollow shaft 144 causes the drum 16 to rotate. Also, the interior of the shaft 144 communicates with the interior of the drum.

Bearings 146 are provided at opposite ends of the shaft 144. The inner races of the bearings 146 are mounted on the shaft 144, and the outer races of the bearings are disposed against bushings 148 secured to a housing 150 by a plurality of studs 152. An arcuate opening 156 is provided in the housing 150 between the bearings 146. This opening enables a drive belt 158 to extend into the housing and around a pulley 160. The pulley 160 is affixed to the shaft 144 between the bearings 146 and is held against axial movement by sleeves 162 positioned on the shaft between the bearings and the pulley. In this manner, the shaft 144 and the drum 16 can be rotated by a suitable motor (not shown) coupled to the pulley 160 by the drive belt 158.

The bearings 146 and the sleeves 162 are held on the shaft 144 by a nut 166. The nut 166 is screwed on a threaded portion at the bottom of the shaft and is maintained in fixed position on the shaft by a lock washer 164. A sealing disk 168 is also screwed on the threaded portion at the bottom of the shaft 144. The sealing disk 168 operates in conjunction with a bottom plate 170 to resist the movement of air between the interior of the housing 150 and the interior of the hollow shaft 144 when a difference of pressure exists between the housing and the shaft.

The bottom plate 170 is secured to the housing 150 by a plurality of studs 172, and the bottom plate is provided with a central opening. A hollow conduit 174 extends into the opening in friction-fit with the plate 170. The conduit 174 is axially aligned with the hollow shaft 144 so that air may be exhausted from the hollow interiors of the shaft and the conduit by a vacuum pump 176. The vacuum pump may be of any suitable known construction and for that reason is shown in block form in Figure 2.

The vacuum pump 176 draws air inwardly through the orifices 122 and 124 and through the interior of the drum 16 down the shaft 144 and through the conduit 174. This creates a vacuum pressure at the outer peripheral surface of the annular portion 120 of the lower section of the drum 16. The deflector ring 140 and the convex underside of the disk-like member 130 assure that air will flow smoothly and with a minimum of turbulence. This provides a high and adequate vacuum pressure around the outer peripheral surface of the annular side portion 120 firmly to retain the cards on that surface as they are transported by the drum.

Reference will now be made to Figures 4, 5, 6 and 7 in particular for a detailed description of the manner in which the feed head 18 and the stack head 20 are controlled between their operating and stand-by positions, and the manner in which the wheel 71 is moved from one position to another. It will be understood that a similar control mechanism can be used for the equivalent components of the card holder station 12.

The stack head 20 is secured to one end of a lever arm 200 by means of an upright post 202. This post extends through the slot 42 in the table top 11, and it is clamped to the stack head by means of a screw 204 which extends through a bent-over portion of the stack head. The lever arm 202 extends across the underside of the table top 11, and this arm is pivotally mounted to the table top by means of a shaft 206. This shaft 206 extends through the table top 11 and through the lever arm, and it is fastened to the table top by means of a nut 208 which is threaded to the upper end of the shaft. A nut 210 is threaded to the lower end of the shaft 206 and engages the underside of the lever arm 200. In this manner, the lever arm is pivotally mounted for angular movement about the shaft 206.

A cam assembly 212 is mounted on a vertical shaft 214, this shaft being rotatably mounted in a bracket 216 which is secured to the underside of the table top 11 by means, for example, of a plurality of screws such as the screw 218. The bracket 216 has an intermediate transverse shelf member 220 secured to it by means of a plurality of screws, such as the screws 222. The shelf 220 has a central aperture through which the shaft 214 extends, and the rim of this aperture forms an intermediate bearing for the shaft. The bracket 216 also has a top plate 224 which has a central aperture or depression in axial alignment with the central aperture of the member 220. The central aperture or depression in the top plate 224 forms a top bearing for the shaft 214.

A clutch mechanism 226 is mechanically coupled to the lower end of the shaft 214, and the clutch mechanism is positioned in coaxial relationship with the shaft. The clutch mechanism 226 is of the known overriding type, and it includes a clutch collar 228. This collar has a pair of diametrically opposite radial ears 230, and the collar is adjustable angularly on the shaft 214. The lower end of the clutch mechanism 226 is keyed to a coaxial sprocket wheel 232, and the hub 234 of the sprocket wheel is rotatably mounted in a bearing in a bottom plate 236. This bottom plate is secured to the bracket 216 by means of a plurality of screws, such as the screws 238.

The chaft 214 has a switch actuator surface 214*a* positioned below the cam assembly 212. A plurality of switches 240 are mounted on the shelf 220. These switches have their actuating arms in engagement with the switch actuating surface 214*a* of the shaft 214. The switch actuating surface 214*a* is shaped so that the various switches 240 may be operated at preselected angular positions of the shaft 214. The switches 240 may be used to provide desired control operations in the manner described, for example, in the copending application Serial No. 645,639. As mentioned above, this control system is fully described in the copending case.

Figure 5:
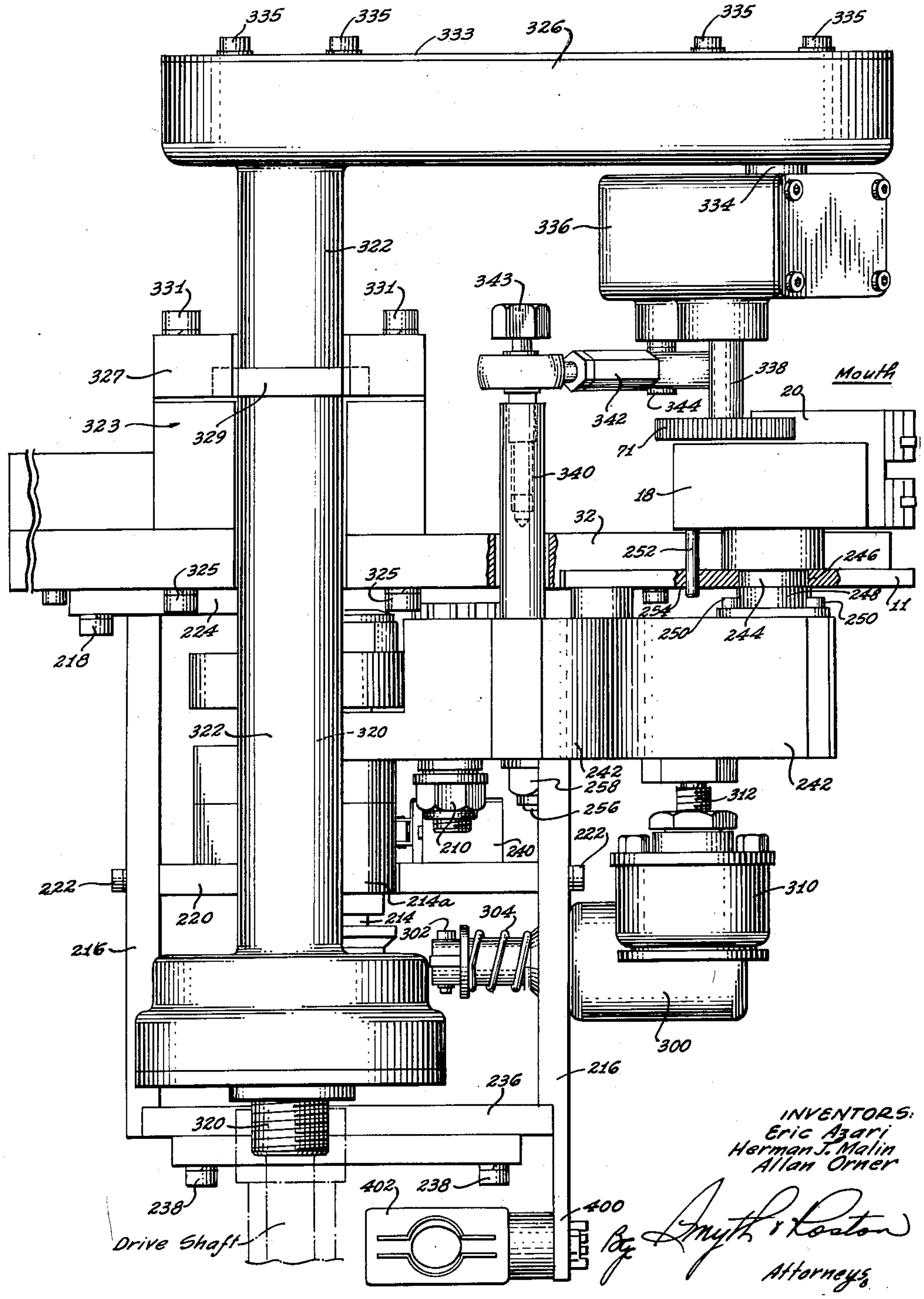
Figure 5 is a side elevational view of the improved card holding station of the invention with the mouth of the station being disposed to the right, this latter view showing more clearly the manner in which the rotatable element is driven, and how it is coupled to the lever which controls the positioning of the feed head.

As shown more clearly in Figure 5, the feed head 18 is supported on a lever arm 242 by means of a hollow upright rod 244. The rod 244 extends through a slot 246 in the table top and into the feed head 18. The rod 244 is supported on the lever arm 242 by means of a bracket 248 and the bracket is secured to the lever arm 242 by screws such as the screws 250.

In the manner fully described in the copending application Serial No. 645,639, the feed head 18 is rotatable about the axis of the rod 246. The feed head has a pin 252 which extends downwardly from its lower surface and through a slot 254 in the table top 11. The arrangement is such that when the feed head is moved between its operating and stand-by positions, the pin 252 causes the feed head to rotate about the axis of the rod 244.

Such rotation of the feed head closes a valve in the feed head when the feed head is moved back to its stand-by position. Closure of this valve cuts off the vacuum pressure at the surface 18' of the feed head. The internal details of the feed head are fully described in the copending case Serial No. 645,639, and a detailed description of the internal valve mechanism is believed to be unnecessary because the feed head itself and the internal valve mechanism forms no part of the present invention.

The lever arm 242 is pivotally mounted to the underside of the table top 11 by a shaft 256. The lever arm 242 is held on the shaft 256 by means of a nut 258 which is threaded to the lower end of the shaft. The shaft 256 and the nut 258 are more clearly shown in Figure 6.

The cam assembly 212 forms a channel 260 (Figure 7) which receives a cam follower 262 rotatably mounted on one end of the lever arm 200, and the channel 260 also receives a cam follower 264 rotatably mounted on one end of the lever arm 242. The cam assembly 212 completely encloses the cam followers 262 and 264 to obviate any need for biasing springs, and the channel 260 is shaped so that when the cam assembly 212 is rotated, the lever arms 200 and 242 are pivotally moved on their shafts 206 and 256 as fulcrums to move the feed head to its operative position and the stack head to its stand-by position for a first 180° rotation of the cam assembly and to move the feed head to its stand-by position and the stack head to its operative position for a second 180° rotation of the cam assembly.

A solenoid 300 (Figures 4 and 5) is supported on the bracket 216, and the armature 302 of the solenoid extends into engagement with one of the ears 230 of the clutch collar 228. A spring 304 biases the armature into such engagement when the solenoid 300 is de-energized. When the solenoid is momentarily energized, the armature 302 is moved out of engagement with the ear 230 and the clutch collar 228 causes the clutch mechanism 228 to engage. When the clutch engages, rotational motion of the sprocket 232 is translated to the shaft 214, and the clutch collar 228 also rotates. If the solenoid 300 is de-energized before the shaft has been rotated through 180°, its armature 302 will engage the opposite ear 230 of the collar 228 to disengage the clutch.

Therefore, by pulsing the solenoid 300, a continuous rotation of the sprocket wheel 232 can be caused to impart successive 180° rotations to the shaft 214. Each such rotation, as described above, is adjusted to change the operating condition of the card holder station. The clutch collar 228 is angularly adjustable on the shaft 214, as mentioned above, so that the angular rotations of the shaft 214 can be adjusted precisely to bring the heads 18 and 20 to their proper operating or stand-by positions, each time the solenoid 300 is pulsed.

The vacuum pressure to the feed head 18 is introduced through a solenoid valve 310 by a suitable inlet line (not shown). The solenoid valve 310 is incorporated into a suitable control circuit so that the valve may be momentarily energized to cut off the vacuum pressure at the surface 18' of the feed head and so release a card from the station. Such a solenoid control is fully described, for example, in the copending application Serial No. 645,639. It will be observed that the outlet from the solenoid extends through a lead line 312 and through the lever arm 242 to be coupled into the hollow rod 244 extending to the feed head.

Figure 6:
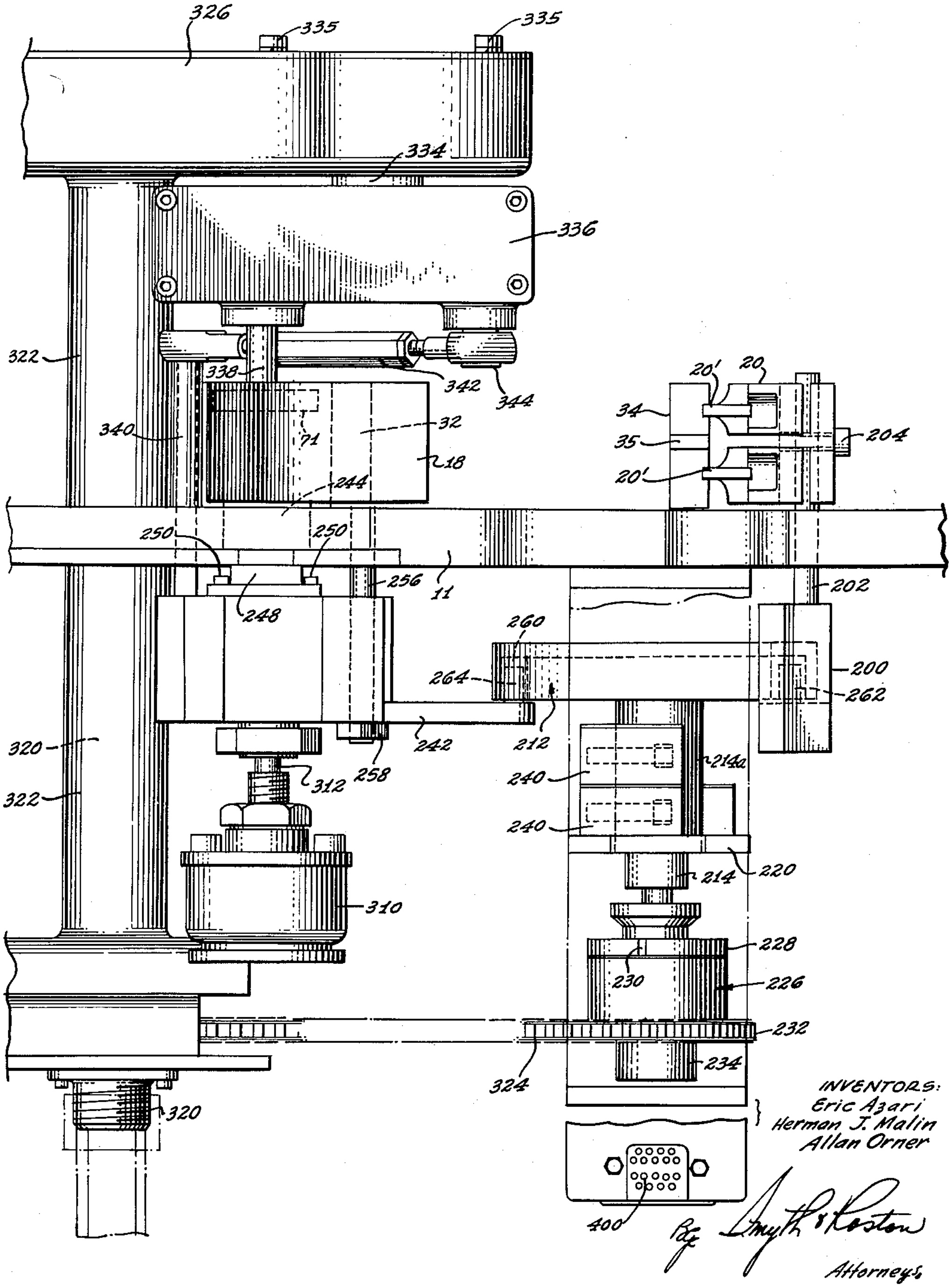
Figure 6 is another elevational view of the improved card holding station of the invention with certain components removed, this view being taken from the front of the station and showing particularly the manner in which the cam assembly engages the levers which in turn control the position of the feed head and the position of the stack head, and the chain drive to this assembly.

As shown more clearly in Figures 2 and 6, the stack head 20 is slotted so that the tongue 35 will not interfere with the inward travel of the stack head as it is moved to its operative position to permit the stack head to have a width corresponding to the full width of the cards to be arrested by it. This combination of the tongue 35 and the slotted stack head 20, and the benefits and features of this combination, are fully described and claimed in copending application 715,926, filed February 18, 1958.

A second vertical shaft 320 is supported in a tubular housing 322, and the second shaft extends through the table top 11 in spaced parallel relationship with the shaft 214, as best shown in Figure 6. The shaft 320 constitutes the drive shaft for the assembly, and it is coupled to a suitable source of driving power (not shown). The shaft 320 is coupled to the sprocket wheel 232 by means of a chain drive 324. It will be appreciated that the shaft 320 is continually rotated so that continuous rotation is imparted to the sprocket wheel 232. However, only when the solenoid 300 is pulsed is the rotation of the sprocket wheel 232 translated to the shaft 214, and then only for a 180° rotation of the shaft 214.

The tubular housing 322 and the enclosed shaft 320 extend through the table top 11 into a horizontal housing 326, the housing 326 being supported by the tubular housing 322. The tubular housing 322 is rigidly supported on the table top 11 by means of a mounting block 323. This mounting block has a central aperture which receives the tubular housing 322, and it is secured to the table top by screws 325 extending through the table top. The block 323 has an upper portion 327 which engages a collar 329 (Figure 5) of the tubular member 322. The upper portion 327 is fastened to the blocks by screws 331.

The housing 326 has a cover 333 which is secured to the housing by screws 335. A sprocket wheel 328 (Figure 1) is keyed to the top of the shaft 320 and is disposed in the housing 326. The sprocket 328 is coupled to a second sprocket wheel 330 at the other end of the housing 326 by means of a chain drive 332. The sprocket wheel 330 is affixed to a shaft 334 which extends down into and pivotally supports a second horizontal housing 336. A second sprocket wheel is keyed to the lower end of the shaft 334, and this latter sprocket wheel is situated in the housing 336. This second sprocket wheel is coupled to a further sprocket wheel 337 at the other end of the housing 336, and the sprocket wheel 337 is keyed to a shaft 338. The shaft 338 extends through the bottom of the housing 336 and the wheel 71 is keyed to its lower end. The arrangement is such that the housing 336 can be pivoted on the shaft 334 to move the wheel 71 from one position to another for the reasons described above.

A vertical stud 340 is mounted on the lever arm 242, and this stud extends upwardly from the lever arm 242 through the table top 11. The upper end of the stud 340 is coupled to a horizontal link 342, the link being rotatably mounted on a pin 343 which is threaded into the stud 340. The other end of the link 342 is rotatably coupled to a pin 344 which extends from the lower surface of the housing 336. The central portion of the link 342 is in the form of an adjustable sleeve which is threaded on the link, and which serves to adjust the length of the link.

The rotational movement of the drive shaft 320 is translated to the wheel 71 in the manner described above, and the wheel 71 is continuously rotated. Also, the position of the wheel 71 is controlled by the linkage mechanism including the members 340, 342 and 344. The member 340 is coupled to the lever arm 242, as mentioned above, so that pivotal movement of the lever arm 242 about its shaft 256 causes the wheel 71 to move from one position to another. The length of the link 342 is adjustable so that the wheel 71 may have a precisely located selected position when the card holder station is actuated to a stacking mode, and so that the wheel will have a second precisely located position when the card holder station is actuated to a feeding mode.

As shown, for example, in Figures 4, 5 and 6, the lower end of the bracket 216 is formed into a socket 400 which is adapted to receive a plug 402. In this manner, all the electrical connections required by the assembly may be conveniently made to the socket 400, and the corresponding external connections may conveniently be brought to the assembly by way of the plug 402.

The manner in which the pick-off 22 and its associated blower unit function to deposit a card in the station 10, when the station is in its stacking mode, is shown in the fragmentary views of Figures 8–10.

The orifices 61 in the blower unit portion of the pick-off 22 are positioned to direct the pressurized streams issuing from them over the crest of the bulged body portion of the pick-off. Then, and as shown in Figure 8, when no card is being stacked in the station 10, the pressurized stream impinges on the cards already in the station and holds these cards back away from the transport drum 16. This assists the wheel 71 in providing a clear path for the cards carried by the drum to the mouth of the station, and such cards can be quickly carried by the drum over the pick-off to a stacking position without interference from the preceding cards.

When a card is brought to the mouth of the station 10 by the transport drum 16, such a card, as shown in Figure 9, rides over the crest of the body portion of the pick-off 22, and the card is guided into the proper position by the arms 53 and 55 (Figure 2). The card in the position shown in Figure 9 is not in a position to interfere to any extent with the pressurized air streams emitted by the blower portion of the pick-off. These streams still function, therefore, to hold the cards already in the station, back out of the way of the card being deposited in the station. This enables the card to be quickly and positively brought to a stacking position by the transport drum 16.

Now, when the card is brought to a stacking position by the drum 16 across the mouth of the station, the trailing end of the card is moved up across the pressurized air stream, as shown in Figure 10, as the card moves over the crest of the body portion of the pick-off. As the trailing end of the card moves into the air streams, the streams blow that end of the card in the illustrated manner up into the station. The card is now held clear together with the preceding cards in the station, so that the action can be repeated for subsequent cards.

The invention provides, therefore, a new and improved reversible card holder station for use in card processing apparatus. The card holder station of the invention may be constructed in a relatively simple manner, and it constitutes a compact, rugged and commercially feasible assembly.

What is claimed is:

1. In apparatus for processing data on a plurality of information storage cards as represented by signal indications on the cards, the combination of: a card holder for maintaining the cards in a stacked relationship, a rotatable drum positioned adjacent the card holder to provide a transfer of cards between the drum and the card holder and constructed to hold the cards in fixed position on the drum during the rotation of the drum, a feed head movable to a position operative upon the cards in the card holder to obtain a controlled transfer of cards from the card holder to the transport means and movable to a stand-by position out of operative relationship with the cards in the card holder, a stack head movable to a position operative upon the cards on the drum to obtain a controlled transfer of cards into the card holder from the transport means and movable to a stand-by position out of operative relationship with the cards on the drum, first and second lever arms connected respectively to the feed head and to the stack head to obtain a movement of the heads in accordance with the movements of the associated lever arms, first and second cam followers mounted on respective ones of the first and second lever arms to obtain a movement of the lever arms in accordance with the movements of the associated cam followers, a first rotatable shaft, a cam assembly including a cam mounted on the first rotatable shaft in coaxial relationship therewith and defining a channel for receiving the cam followers to provide a movement of the cam followers in accordance with the movement of the cam, a clutch mechanism mechanically coupled to the first rotatable shaft in coaxial relationship therewith, a second shaft rotatably mounted in spaced parallel relationship with the first shaft and adapted to be coupled to a source of driving power, means for mechanically coupling the second shaft to the clutch mechanism to cause the first shaft to be rotated through 180 degrees for each actuation of the clutch mechanism for a movement of the feed head from its stand-by position to its operative position and a concurrent movement of the stack head from its operative position to its stand-by position for a first mode of operation and for a movement of the feed head from its operative position to its stand-by position and a concurrent movement of the stack head from its stand-by position to its operative position for a second mode of operation, a rotatable element positioned adjacent the card holder and extending into the card holder for engaging one end of the cards in the card holder to draw such end away from the drum and maintain at least the leading cards in the card holder at an angle to the drum, means for coupling the second shaft to the rotatable element for imparting rotational motion to the rotatable element, and means coupling the rotatable element to one of the lever arms to cause the rotatable element to assume a first position for the first mode of operation and a second position for the second mode of operation thereby to cause the leading cards in the card holder to assume a different angle with respect to the transport means in the first mode of operation as compared with the angle assumed in the second mode of operation.

2. Apparatus for transporting and stacking information storage cards including: transport means for the cards, card holder means positioned in coupled relationship to the transport means for supporting cards in a stacked condition and for providing a transfer of cards between the card holder and the transport means, transfer means disposed in coupled relationship to the card holder and the transport means for obtaining a transfer of cards between the transport means and the card holder means, a movable element mounted adjacent the card holder means and movable between first and second operative positions for engaging one end of the cards in the card holder means in the first and second positions to draw that end away from the transport means to maintain at least the leading cards in the card holder means at an inclination to the transport means, and means operative upon the movable element for adjusting the position of the movable element to the first position during a transfer of cards from the card holder to the transport means and to the second position during a transfer of cards from the transport means to the card holder to change the inclination of such leading cards in accordance with the disposition of the movable element and to facilitate the transfer of cards between the card holder and the transport means.

3. Apparatus for transporting and stacking information storage cards including: a supporting table, transport means for the cards and positioned on the supporting table, card holder means positioned on the supporting table in coupled relationship to the transport means and having a leading wall and a trailing wall for supporting cards therebetween in a stacked condition with one edge of the cards disposed on the supporting table, transfer means disposed in coupled relationship to the card holder and the transport means and having a first operating condition for obtaining a transfer of the cards from the card holder means to the transporting means and having a second operating condition for obtaining a transfer of the cards from the transporting means to the card holder means, a rotatable element mounted adjacent the card holder means for engaging one end of the cards in the card holder means to draw that end away from the transporting means to maintain at least the leading cards in the card holder means at an inclination to the transporting means, and means coupled to the transfer means for movement in accordance with the movement of the transport means and operative upon the rotatable element in accordance with such movement for adjusting the position of the rotatable element to provide a first inclination for the leading cards when the transfer means is in its first operating condition and to provide a second inclination for the leading cards when the transfer means is in its second operating condition.

4. In apparatus for processing data on a plurality of information storage cards as represented by signal indications on the cards, the combination of: a transport medium for the cards, a card holder positioned adjacent the transport medium for maintaining the cards in a stacked relationship and having a trailing wall and a leading wall with respect to the movement of cards on the transport medium, a stack head positioned adjacent the trailing wall for controlling the transfer of cards from the transport medium into the card holder, a pick-off member positioned adjacent the leading wall and disposed in cooperative relationship with the transport means for holding the trailing edge of a card arrested by the stack head outwardly from the surface of the transport medium, said pick-off member including a body portion and means for directing at least one stream of pressurized fluid over the surface of the body portion to provide a fluid cushion for cards passing over the body portion, the stack head including at least one aperture in axial alignment with the stream of pressurized fluid to provide a passage for the stream and thereby prevent turbulence.

5. In apparatus for processing data on a plurality of information storage cards as represented by signal indications on the cards, the combination of: a transport medium for the cards, a card holder positioned in coupled relationship to the transport medium for maintaining the cards in a stacked relationship and having a trailing wall and a leading wall with respect to the movement of cards on the transport medium, a feed head positioned adjacent the leading wall of the card holder, said feed head being movable to a position operative upon the cards in the card holder to obtain a controlled transfer of cards from the card holder to the transport medium and being movable to a stand-by position out of operative relationship with the cards in the card holder, a stack head positioned adjacent the trailing wall of the card holder, said stack head being movable to a position operative upon the cards on the transport medium to provide a controlled transfer of cards from the transport medium into the card holder and being movable to a stand-by position out of coupled relationship with the cards on the transport medium, a pick-off member positioned adjacent the leading wall of the card holder for holding the trailing end of a card arrested by the stack head outwardly from the surface of the transport medium, said pick-off member including a body portion, and means coupled to the body portion for directing at least one stream of air under pressure over the surface of the body portion to provide an air cushion for cards passing over the body portion, said stack head including at least one aperture in respective axial alignment with the stream to provide a passage for the stream and thereby prevent turbulence.

6. In apparatus for processing data on a plurality of information storage cards as represented by signal indications on the cards, the combination of: a rotatable vacuum pressure transport drum for transporting the cards on its peripheral surface, said drum having at least one annular groove extending around the peripheral surface, a card holder positioned adjacent the transport drum for maintaining the cards in a stacked relationship and having a trailing wall and a leading wall with respect to the rotation of the transport drum, a feed head positioned adjacent the leading wall of the card holder, said feed head being movable to an operative position in coupled relationship with the cards in the card holder to obtain a controlled transfer of cards from the card holder to the transport drum and being movable to a stand-by position out of coupled relationship with the cards in the card holder, a stack head positioned adjacent the trailing wall of the card holder, the stack head being movable to an operative position in coupled relationship with the cards on the transport means to provide a controlled transfer of cards from the transport drum into the card holder and being movable to a stand-by position out of coupled relationship with the cards on the transport means, said stack head having at least one finger extending into the peripheral groove of the transport drum when the stack head is in its operative position, a pick-off member positioned adjacent the leading wall of the card holder for holding the trailing edge of a card arrested by the stack head outwardly from the surface of the transport means, said pick-off member including a body portion having at least one finger extending into the groove in the peripheral surface of the transport drum, said pick-off member including further means coupled to the body portion for directing at least one stream of pressurized fluid over the surface of the body portion to provide a fluid cushion for cards passing over the body portion, and the stack head including at least one aperture in axial alignment with the stream to provide a passage for the stream and thereby prevent turbulence.

7. In apparatus for processing data on a plurality of information storage cards as represented by signal indications on the cards, the combination of: a transport medium for the cards, a card holding station positioned with its mouth adjacent the transport medium for maintaining the cards in a stacked relationship, a stack head positioned at the mouth of the card holder station for controlling the transfer of cards from the transport medium to the card holder station, a pick-off member positioned at the mouth of the card holder station and disposed in cooperative relationship with the transport medium including a crested body portion for holding the trailing end of a card arrested by the stack head outwardly from the surface of the transport medium, said pick-off including means for directing at least one stream of pressurized fluid over the crest of the body portion and against the leading card of a stack of cards already in the station to hold such cards away from the transport medium for a movement of a transported card over the body portion of the pick-off and across the mouth of the station by the transport medium without being impeded by cards already in the station to blow the trailing end of the transported card into the station when that card is in position across the mouth of the station.

8. Apparatus for transporting and stacking information storage cards including: a transport medium for the cards, a card holding station positioned with its mouth adjacent the transport medium for maintaining the cards in a stacked relationship, transfer means disposed in coupled relationship to the card holding station and transport medium and having a first operating condition for obtaining a transfer of cards from the card holding station to the transport medium and having a second operating condition for obtaining a transfer of the cards from the transport medium to the card holding station, a rotatable element mounted adjacent the mouth of the card holding station for engaging one end of the cards in the station to draw that end away from the transport medium to maintain at least the leading cards in the card holding station at an inclination to the transport medium, means for adjusting the position of the rotatable element to provide a first inclination for the leading cards when the transfer means is in its first operating condition and to provide a second inclination for the leading card when the transfer means is in its second operating condition, a pick-off member positioned at the mouth of the card holder station and disposed in cooperative relationship with the transport medium and including a crested body portion for holding the trailing end of a card arrested by the transfer means in its second operating condition outwardly from the surface of the transport medium, said pick-off including means for directing at least one stream of pressurized fluid over the crest of the body portion and against the leading card of the stack of cards already in the station to assist the rotatable element in holding such cards away from the transport medium for movement of a transported card over the body portion of the pick-off and across the mouth of the station without being impeded by cards already in the station and to blow the trailing end of the latter card into the station when the card is in position across the mouth of the station.

9. In apparatus for processing data on a plurality of information storage cards as represented by signal indications on the cards, the combination of: a card holding station constructed to hold the cards in the station, transport means for the cards and disposed in coupled relationship to the cards in the station for a transfer of cards from the transport means into the card holding station, a stack head disposed in coupled relationship to the cards on the transport means at a position near the card holding station to provide a transfer of cards from the transport means into the station, a pick-off member disposed in coupled relationship to the transport means at a position removed from the stack head for a disposition of the trailing end of each card on the pick-off member at the time that the leading end of the card is being received by the stack head for the transfer of the card into the station, and pneumatic means disposed in adjacent relationship to the pick-off member for directing a force toward the station in a direction corresponding to the disposition of the cards in the station for a movement of the trailing ends of the cards in the station away from the transport means and for an unimpeded transfer of each transported card into the station.

10. In apparatus for processing data on a plurality of information storage cards as represented by signal indications on the cards, the combination of: transport means for the cards, a card holder including first and second spaced walls and constructed to retain the cards in a stacked relationship and disposed relative to the transport means for a transfer of cards into the card holding station from the transport means, a stack head disposed in coupled relationship to the transport means at a position near the first wall of the card holder to obtain a transfer of cards from the transport means into the card holder, a pick-off member disposed in coupled relationship to the transport means at a position between the first and second walls of the card holder and near the second wall and having crested configurations to displace outwardly from the transport means the trailing end of each card being transferred into the card holder, and means including at least one orifice disposed relative to the pick-off member at a position near the pick-off member for directing a stream of fluid under pressure past the pick-off member and against the cards in the card holder in a direction against the faces of the stacked cards to maintain the cards away from the transport means for a movement of the successive cards on the transport means against the trailing ends of the cards on the pick-off member to facilitate the transfer into the card holder of the cards on the pick-off member.

11. In apparatus for processing data on a plurality of information storage elements and including transporting means for the elements, the combination of: a feeding-stacking station constructed to hold the information storage elements and having a mouth disposed adjacent the transporting means, means disposed in cooperative relationship with the station for establishing the station to a feeding mode to cause information storage elements to be fed therefrom to the transporting means and for establishing the station to a stacking mode to cause information storage elements to be deposited therein from the transporting means, assist means positioned at the mouth of the station for engaging one of the edges of at least the leading storage elements in the station to draw a particular one of the ends of the leading storage elements away from the transporting means, and means for controlling the relative positions of at least the leading storage elements in the station and the assist means so that the leading storage elements in the station may have a first position with respect to the assist means when the station is in its feeding mode and a different position with respect to the assist means when the station is in its stacking mode.

12. In apparatus for processing data on a plurality of information storage cards and which includes transporting means for the cards, the combination of: a feeding-stacking station for holding the cards in a stacked condition having a mouth disposed adjacent the transporting means, means for establishing the station to a feeding mode to cause cards to be fed therefrom to the transporting means and for establishing the station to a stacking mode to cause cards to be deposited therein from the transporting means, movable assist means for engaging the trailing edges of the cards as the same are moved to the mouth of the station by the transporting means and deposited in the station when the station is in its stacking mode, said assist means being movable in a direction to cause the trailing ends of the cards engaged thereby to be moved in a direction away from the transporting means, and means for controlling the relative positions of at least the leading cards in the station and the assist means so that the leading cards in the station have a first position with respect to the assist means when the station is in its feeding mode and a different position with respect to the assist means when the station is in its stacking mode.

13. In apparatus for processing data on a plurality of information storage cards and which includes transporting means for the cards, the combination of: a feeding-stacking station for holding the cards in a stacked condition and having a mouth disposed adjacent the transporting means, means for establishing the station to a feeding mode to cause cards to be fed therefrom to the transporting means and for establishing the station to a stacking mode to cause cards to be deposited therein from the transporting means, rotatable assist means for engaging the trailing edges of the cards as the same are moved to the mouth of the station by the transporting means and deposited in the station when the station is in its stacking mode and for engaging the trailing edges of the leading cards in the station when the station is in its feeding mode, said assist means being rotatable in a direction to cause the trailing ends of the cards engaged thereby to be moved in a direction away from the transporting means, and means for controlling the relative positions of at least the leading cards in the station and the assist means so that the leading cards in the station may have a first position with respect to the assist means when the station is in its feeding mode and a different position with respect to the assist means when the station is in its stacking mode.

14. In apparatus for processing data on a plurality of information storage cards as represented by signal indications on the cards, the combination of: a transport medium for the cards, a card holder positioned adjacent the transport medium for maintaining the cards in a stacked relationship and having a trailing wall and a leading wall with respect to the movement of cards on the transport medium, a feed head positioned adjacent the leading wall of the card holder, said feed head being movable to an operative position in coupled relationship to the cards in the card holder to obtain a controlled transfer of cards from the card holder to the transport medium and being movable to a stand-by position out of coupled relationship with the cards in the card holder, a stack head positioned adjacent the trailing wall of the card holder, said stack head being movable to an operative position in coupled relationship to the cards on the transport means to provide a controlled transfer of cards from the transport medium into the card holder and being movable to a stand-by position out of coupled relationship with the cards on the transport means, a pick-off member positioned adjacent the leading wall of the card holder for maintaining the trailing edge of a card arrested by the stack head outwardly from the surface of the transport medium, first and second lever arms connected respectively to the feed head and to the stack head to provide a movement of the heads in accordance with the movement of the associated lever arms, first and second cam followers respectively mounted on the first and second lever arms to provide a movement of the lever arms in accordance with a movement of the associated cam followers, a rotatable cam assembly defining a channel for receiving the cam followers and for producing a movement of the cam followers in accordance with the movement of the cam assembly, and driving means for rotating the cam assembly to obtain a movement of the feed head from its stand-by position to its operative position and a concurrent movement of the stack head from its operative position to its stand-by position for a first mode of operation and to obtain a movement of the feed head from its operative position to its stand-by position and a concurrent movement of the stack head from its stand-by position to its operative position for a second mode of operation, said pick-off member including a body portion and means for directing at least one stream of pressurized fluid over the surface of the body portion, and the stack head including at least one aperture in axial alignment with the stream of pressurized fluid to provide a passage for the stream and thereby prevent turbulence.

15. In a system for processing data on a plurality of information storage cards, the combination of: transport means for the cards, card holding means including a card supporting surface and a pair of spaced guide rails and disposed relative to the transport means to facilitate a transfer of cards between the card holding means and the transport means, a feed head disposed in a first position relative to the cards in the card holding means to obtain a transfer of cards from the card holding means to the transport means and movable to a second position to prevent a transfer of cards from the card holding means to the transport means, a stack head disposed in a first position relative to the cards in the transport means to obtain a transfer of cards from the transport means to the card holding means and movable to a second position to prevent the transfer of cards from the transport means to the card holding means, assist means disposed relative to the cards in the card holding means to position the cards in the card holding means for facilitating the transfer of cards between the transport means and the card holding means, and means responsive to the movements of the feed head to the first position for disposing the last mentioned means in a first particular relationship with respect to the cards in the card holding means and responsive to the movements of the stack head to the first position for positioning the last mentioned means in a second particular relationship different from the first particular relationship with respect to the cards in the card holding means.

16. The combination set forth in claim 15 in which the transport means constitutes a rotatable drum constructed to hold cards in fixed position on the drum during drum rotation and in which the assist means includes a rotatable wheel engaging the trailing ends of the leading cards in the station and rotatable in a direction to move the trailing ends of the cards away from the transport means.

References Cited in the file of this patent

UNITED STATES PATENTS

| | | |
|---|---|---|
| 304,936 | Jones | Sept. 9, 1884 |
| 740,816 | Daily | Oct. 6, 1903 |
| 2,181,829 | Jeffrey | Nov. 28, 1939 |
| 2,222,287 | Ford | Nov. 19, 1940 |
| 2,260,199 | Sinclair et al. | Oct. 21, 1941 |
| 2,503,521 | Stover | Apr. 11, 1950 |
| 2,842,362 | Hayes et al. | July 8, 1958 |
| 2,883,188 | Gray et al. | Apr. 21, 1959 |